(12) United States Patent
Bangalore et al.

(10) Patent No.: US 8,103,502 B1
(45) Date of Patent: *Jan. 24, 2012

(54) SYSTEMS AND METHODS FOR EXTRACTING MEANING FROM MULTIMODAL INPUTS USING FINITE-STATE DEVICES

(75) Inventors: Srinivas Bangalore, Hackettstown, NJ (US); Michael J. Johnston, Hoboken, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 744 days.

This patent is subject to a terminal disclaimer.

(21) Appl. No.: 11/904,085

(22) Filed: Sep. 26, 2007

Related U.S. Application Data

(63) Continuation of application No. 10/970,215, filed on Oct. 21, 2004, now Pat. No. 7,295,975, which is a continuation of application No. 09/904,252, filed on Jul. 12, 2001, now Pat. No. 6,868,383.

(51) Int. Cl.
*G10L 17/00* (2006.01)
(52) U.S. Cl. ........ 704/249; 704/243; 704/251; 704/255; 704/256; 704/270; 704/9; 706/11; 715/809; 715/863
(58) Field of Classification Search ............... 704/9, 251, 704/256, 243, 255, 270; 706/11; 715/809, 715/863
See application file for complete search history.

(56) References Cited

U.S. PATENT DOCUMENTS

| | | | |
|---|---|---|---|
| 6,484,136 B1 * | 11/2002 | Kanevsky et al. | 704/9 |
| 6,823,308 B2 * | 11/2004 | Keiller et al. | 704/256 |
| 7,054,812 B2 * | 5/2006 | Charlesworth et al. | 704/251 |
| 7,240,004 B1 * | 7/2007 | Allauzen et al. | 704/255 |
| 7,321,854 B2 * | 1/2008 | Sharma et al. | 704/243 |
| 7,783,485 B2 * | 8/2010 | Allauzen et al. | 704/255 |
| 2004/0119754 A1 * | 6/2004 | Bangalore et al. | 345/809 |
| 2008/0052080 A1 * | 2/2008 | Narayanan | 704/270 |
| 2010/0100509 A1 * | 4/2010 | Johnston et al. | 706/11 |
| 2010/0281435 A1 * | 11/2010 | Bangalore et al. | 715/863 |

\* cited by examiner

*Primary Examiner* — Michael Colucci

(57) ABSTRACT

Multimodal utterances contain a number of different modes. These modes can include speech, gestures, and pen, haptic, and gaze inputs, and the like. This invention use recognition results from one or more of these modes to provide compensation to the recognition process of one or more other ones of these modes. In various exemplary embodiments, a multimodal recognition system inputs one or more recognition lattices from one or more of these modes, and generates one or more models to be used by one or more mode recognizers to recognize the one or more other modes. In one exemplary embodiment, a gesture recognizer inputs a gesture input and outputs a gesture recognition lattice to a multimodal parser. The multimodal parser generates a language model and outputs it to an automatic speech recognition system, which uses the received language model to recognize the speech input that corresponds to the recognized gesture input.

14 Claims, 11 Drawing Sheets

FIG. 5
DISPLAYING 7-11 OUT OF 11
412 — ANTONIO BANDERAS 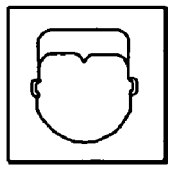
414 — MONUMENTAL PICTURES
412 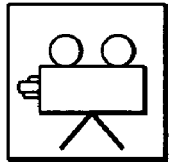
412 — LEONARDO DI CAPRIO 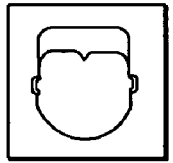
414 — ROBERT DE NIRO
412 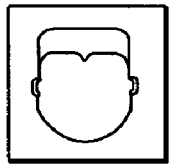
412 — ROBERT REDFORD 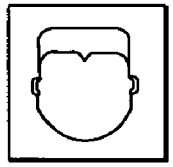
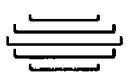 — 420

FIG. 6

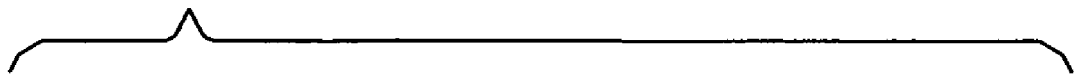

$S \rightarrow V\ NP\ \varepsilon{:}\varepsilon{:}])$     $NP \rightarrow DET\ N$ $CONJ \rightarrow and{:}\varepsilon{:},$     $NP \rightarrow DET\ N\ CONJ\ NP$ $V \rightarrow email{:}\varepsilon{:}email([$     $DET \rightarrow this{:}\varepsilon{:}\varepsilon$ $V \rightarrow page{:}\varepsilon{:}page([$     $DET \rightarrow that{:}\varepsilon{:}\varepsilon$ $N \rightarrow person{:}Gp{:}person($     $ENTRY$ $N \rightarrow organization{:}Go{:}org($     $ENTRY$ $N \rightarrow department{:}Gd{:}dept($     $ENTRY$ $ENTRY \rightarrow \varepsilon{:}e_1{:}e_1\ \ \varepsilon{:}\varepsilon{:})$ $ENTRY \rightarrow \varepsilon{:}e_2{:}e_2\ \ \varepsilon{:}\varepsilon{:})$ $ENTRY \rightarrow \varepsilon{:}e_3{:}e_3\ \ \varepsilon{:}\varepsilon{:})$ $ENTRY \rightarrow ...$

SYSTEMS AND METHODS FOR EXTRACTING MEANING FROM MULTIMODAL INPUTS USING FINITE-STATE DEVICES

CROSS-REFERENCE TO RELATED APPLICATIONS

This application is a continuation of prior U.S. patent application Ser. No. 10/970,215 filed Oct. 21, 2004, now U.S. Pat. No. 7,295,975 which is a continuation of prior U.S. patent application Ser. No. 09/904,252 filed Jul. 12, 2001 which issued as U.S. Pat. No. 6,868,383, both of which are incorporated herein by reference.

BACKGROUND OF THE INVENTION

1. Field of Invention

This invention is directed to parsing and understanding of utterances whose content is distributed across multiple input modes.

2. Description of Related Art

Multimodal interfaces allow input and/or output to be conveyed over multiple different channels, such as speech, graphics, gesture and the like. Multimodal interfaces enable more natural and effective interaction, because particular modes are best-suited for particular kinds of content. Multimodal interfaces are likely to play a critical role in the ongoing migration of interaction from desktop computing to wireless portable computing devices, such as personal digital assistants, like the Palm Pilot®, digital cellular telephones, public information kiosks that are wirelessly connected to the Internet or other distributed networks, and the like. One barrier to adopting such wireless portable computing devices is that they offer limited screen real estate, and often have limited keyboard interfaces, if any keyboard interface at all.

To realize the full potential of such wireless portable computing devices, multimodal interfaces need to support not just input from multiple modes. Rather, multimodal interfaces also need to support synergistic multimodal utterances that are optimally distributed over the various available modes. In order to achieve this, the content from different modes needs to be effectively integrated.

One previous attempt at integrating the content from the different modes is disclosed in "Unification-Based Multimodal Integration", M. Johnston et al., *Proceedings of the 35th ACL*, Madrid Spain, p. 281-288, 1997 (Johnston 1), incorporated herein by reference in its entirety. Johnston 1 disclosed a pen-based device that allows a variety of gesture utterances to be input through a gesture mode, while a variety of speech utterances can be input through a speech mode.

In Johnston 1, a unification operation over typed feature structures was used to model the integration between the gesture mode and the speech mode. Unification operations determine the consistency of two pieces of partial information. If the two pieces of partial information are determined to be consistent, the unification operation combines the two pieces of partial information into a single result. Unification operations were used to determine whether a given piece of gestural input received over the gesture mode was compatible with a given piece of spoken input received over the speech mode. If the gestural input was determined to be compatible with the spoken input, the two inputs were combined into a single result that could be further interpreted.

In Johnston 1, typed feature structures were used as a common meaning representation for both the gestural inputs and the spoken inputs. In Johnston 1, the multimodal integration was modeled as a cross-product unification of feature structures assigned to the speech and gestural inputs. While the technique disclosed in Johnston 1 overcomes many of the limitations of earlier multimodal systems, this technique does not scale well to support multi-gesture utterances, complex unimodal gestures, or other modes and combinations of modes. To address these limitations, the unification-based multimodal integration technique disclosed in Johnston 1 was extended in "Unification-Based Multimodal Parsing", M. Johnston, *Proceedings of COLING-ACL* 98, p. 624-630, 1998 (Johnston 2), herein incorporated by reference in its entirety. The multimodal integration technique disclosed in Johnston 2 uses a multi-dimensional chart parser. In Johnston 2, elements of the multimodal input are treated as terminal edges by the parser. The multimodal input elements are combined together in accordance with a unification-based multimodal grammar. The unification-based multimodal parsing technique disclosed in Johnston 2 was further extended in "Multimodal Language Processing", M. Johnston, *Proceedings of ICSLP* 1998, 1998 (published on CD-ROM only) (Johnston 3), incorporated herein by reference in its entirety.

Johnston 2 and 3 disclosed how techniques from natural language processing can be adapted to support parsing and interpretation of utterances distributed over multiple modes. In the approach disclosed by Johnston 2 and 3, speech and gesture recognition produce n-best lists of recognition results. The n-best recognition results are assigned typed feature structure representations by speech interpretation and gesture interpretation components. The n-best lists of feature structures from the spoken inputs and the gestural inputs are passed to a multi-dimensional chart parser that uses a multimodal unification-based grammar to combine the representations assigned to the input elements. Possible multimodal interpretations are then ranked. The optimal interpretation is then passed on for execution.

SUMMARY OF THE INVENTION

However, the unification-based approach disclosed in Johnston 1-Johnston 3 does not allow for tight coupling of multimodal parsing with speech and gesture recognition. Compensation effects are dependent on the correct answer appearing in each of the n-best list of interpretations obtained from the recognitions obtained from the inputs of each mode. Moreover, multimodal parsing cannot directly influence the progress of either speech recognition or gesture recognition. The multi-dimensional parsing approach is also subject to significant concerns in terms of computational complexity. In the worst case, for the multi-dimensional parsing technique disclosed in Johnston 2, the number of parses to be considered is exponential relative to the number of input elements and the number of interpretations the input elements have. This complexity is manageable when the inputs yield only n-best results for small n. However, the complexity quickly gets out of hand if the inputs are sizable lattices with associated probabilities.

The unification-based approach also runs into significant problems when choosing between multiple competing parses and interpretations. Probabilities associated with composing speech events and multiple gestures need to be combined. Uni-modal interpretations need to be compared to multimodal interpretations and so on. While this can all be achieved using the unification-based approach disclosed in Johnston 1-Johnston 3, significant post-processing of sets of competing multimodal interpretations generated by the multimodal parser will be involved.

This invention provides systems and methods that allow parsing understanding and/or integration of the gestural inputs and the spoken inputs using one or more finite-state devices.

This invention separately provides systems and methods that allow multi-dimensional parsing and understanding using weighted finite-state automata.

This invention further provides systems and methods that allow multi-dimensional parsing and understanding using a three-tape weighted finite-state automaton.

This invention separately provides systems and methods that use combinations of finite-state transducers to integrate the various modes of the multimodal interface.

This invention separately provides systems and methods that use the recognition results of one mode of the multimodal input received from the multimodal interface as a language model or other model in the recognition process of other modes of the multimodal inputs received from the multimodal interface.

This invention separately provides systems and methods that use the recognition results of one mode of the multimodal input received from the multimodal interface to constrain the recognition process of one or more of the other modes of the multimodal input received from the multimodal interface.

This invention further provides systems and methods that integrate the recognition results from the second multimodal input, which are based on the recognition results of the first multimodal input, with the recognition results of the first multimodal input and then extract meaning from the combined recognition results.

This invention further provides systems and methods that base the speech recognition on the results of the gesture recognition.

The various exemplary embodiments of the systems and methods according to this invention allow spoken language and gesture input streams to be parsed and integrated by a single weighted finite-state device. This single weighted finite-state device provides language models for speech and gesture recognition and composes the meaning content from the speech and gesture input streams into a single semantic representation. Thus, the systems and methods according to this invention not only address multimodal language recognition, but also encode the semantics as well as the syntax into a single weighted finite-state device. Compared to the previous approaches for integrating multimodal input streams, such as those described in Johnston 1-3, which compose elements from n-best lists of recognition results, the systems and methods according to this invention provide the potential for direct compensation among the various multimodal input modes.

Various exemplary embodiments of the systems and methods according to this invention allow the gestural input to dynamically alter the language model used for speech recognition. Various exemplary embodiments of the systems and methods according to this invention reduce the computational complexity of multi-dimensional multimodal parsing. In particular, the weighted finite-state devices used in various exemplary embodiments of the systems and methods according to this invention provide a well-understood probabilistic framework for combining the probability distributions associated with the speech and gesture or other input modes and for selecting among multiple competing multimodal interpretations.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein:

FIG. 5 is a block diagram illustrating in greater detail one exemplary embodiment of the multimodal user input device of FIG. 2;

FIG. 6 is one exemplary embodiment of a multimodal grammar fragment usable by the multimodal meaning recognition system according to this invention;

DETAILED DESCRIPTION OF EXEMPLARY EMBODIMENTS

Figure 1:
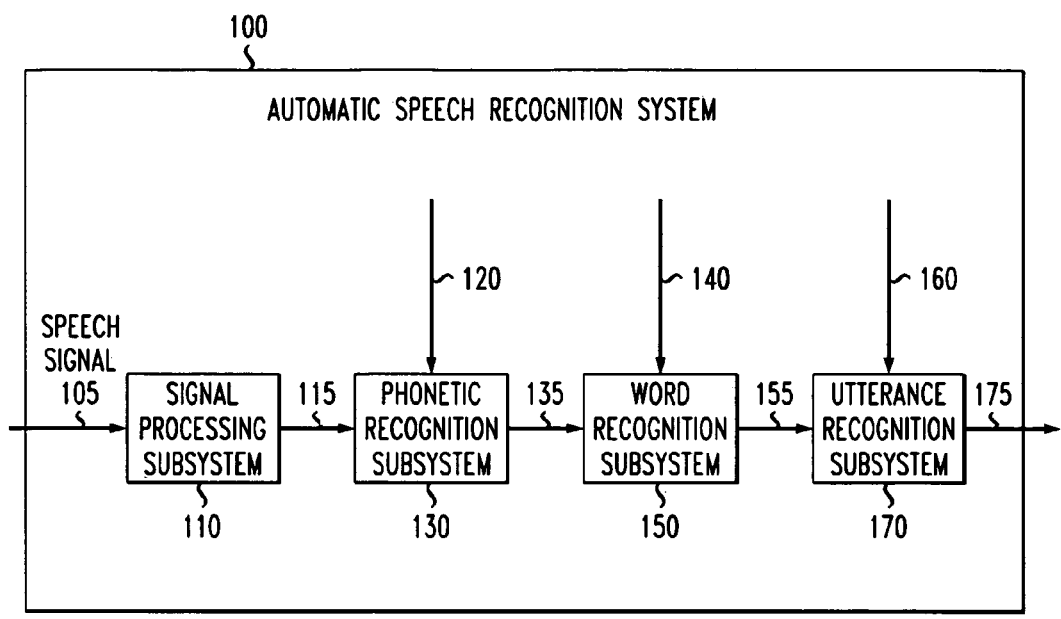
FIG. 1 is a block diagram illustrating one exemplary embodiment of a conventional automatic speech recognition system usable with a multimodal meaning recognition system according to this invention.
Figure 2:
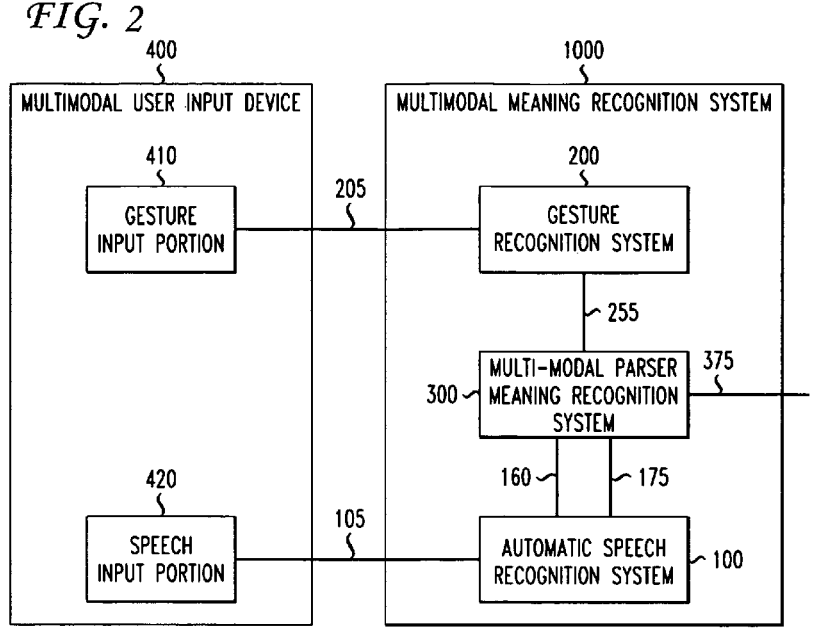
FIG. 2 is a block diagram illustrating one exemplary embodiment of a multimodal user input device and one exemplary embodiment of a multimodal meaning recognition system according to this invention.

FIG. 1 illustrates one exemplary embodiment of an automatic speech recognition system 100 usable with the multimodal recognition and/or meaning system 1000 according to this invention that is shown in FIG. 2. As shown in FIG. 1, automatic speech recognition can be viewed as a processing pipeline or cascade.

In each step of the processing cascade, one or two lattices are input and composed to produce an output lattice. In automatic speech recognition and in the following description of the exemplary embodiments of the systems and methods of this invention, the term "lattice" denotes a directed and labeled graph, which is possibly weighted. In each lattice, there is typically a designated start node "s" and a designated final node "t". Each possible pathway through the lattice from the start node s to the final node t induces a hypothesis based on the arc labels between each pair of nodes in the path. For example, in a word lattice, the arc labels are words and the various paths between the start node s and the final node t form sentences. The weights on the arcs on each path between the start node s and the final node t are combined to represent the likelihood that that path will represent a particular portion of the utterance.

As shown in FIG. 1, one exemplary embodiment of a known automatic speech recognition system 100 includes a signal processing subsystem 110, an acoustic model lattice 120, a phonetic recognition subsystem 130, a lexicon lattice 140, a word recognition subsystem 150, a grammar or language model lattice 160, and a task recognition subsystem 170. In operation, uttered speech is input via a microphone, which converts the sound waves of the uttered speech into an electronic speech signal. The electronic speech signal is input to the signal processing subsystem 110 on a speech signal input line 105. The signal processing subsystem 110 digitizes the electronic speech signal to generate a feature vector lattice 115. The feature vector lattice 115 is a lattice of acoustic feature vectors. The feature vector lattice 115 is input along with the acoustic model lattice 120 to the phonetic recognition subsystem 130. The acoustic model lattice 120 represents a set of acoustic models and is applied to transform the feature vector lattice 115 into a phone lattice. Each node of the phone lattice represents a spoken sound, such as, for example, the vowel /e/ in "bed".

The phone lattice 135 is input along with the lexicon lattice 140 into the word recognition subsystem 150. The lexicon lattice 140 describes different pronunciations of various words and transforms the phone lattice 135 into a word lattice 155. The word lattice 155 is then input, along with the grammar or language model lattice 160, into the utterance recognition subsystem 170. The grammar or language model lattice 160 represents task-specific information and is used to extract the most likely sequence of uttered words from the word lattice 155. Thus, the utterance recognition subsystem 170 uses the grammar or language model lattice 160 to extract the most likely sentence or other type of utterance from the word lattice 155. In general, the grammar or language model lattice 160 will be selected based on the task associated with the uttered speech. The most likely sequence of words, or the lattice of n most-likely sequences of words, is output as the recognized utterance 175.

In particular, one conventional method of implementing automatic speech recognition forms each of the acoustic model lattice 120, the lexicon lattice 140 and the grammar or language model lattice 160 as a finite-state transducer. Thus, each of the phonetic recognition subsystem 130, the word recognition subsystem 150, and the utterance recognition 170 performs a generalized composition operation between its input finite-state transducers. In addition, the signal processing subsystem 110 outputs the features vector lattice 115 as a finite-state transducer.

Conventionally, the grammar or language model lattice 160 is predetermined and incorporated into the automatic speech recognition system 100 based on the particular recognition task that the automatic speech recognition system 100 is to perform. In various exemplary embodiments, any of the acoustic model lattice 120, the lexicon lattice 140 and/or the grammar or language model 160 can be non-deterministic finite-state transducers. In this case, these non-deterministic finite-state transducers can be determinized using the various techniques disclosed in "Finite-state transducers in Language and Speech Processing", M. Mohri, *Computational Linguistics,* 23:2, p. 269-312, 1997, U.S. patent application Ser. No. 09/165,423, filed Oct. 2, 1998, and/or U.S. Pat. No. 6,073,098 to Buchsbaum et al., each incorporated herein by reference in its entirety.

In contrast, in various exemplary embodiments of the systems and methods according to this invention, in the multimodal recognition or meaning system 1000 shown in FIG. 2, the automatic speech recognition system 100 uses a grammar or language model lattice 160 that is obtained from the recognized gestural input received in parallel with the speech signal 105. This is shown in greater detail in FIG. 2. In this way, the output of the gesture recognition system 200 can be used to compensate for uncertainties in the automatic speech recognition system.

Alternatively, in various exemplary embodiments of the systems and methods according this invention, the output of the automatic speech recognition system 100 and output of the gesture recognition system 200 can be combined only after each output is independently obtained. In this way, it becomes possible to extract meaning from the composition of two or more different input modes, such as the two different input modes of speech and gesture.

Furthermore, it should be appreciated that, in various exemplary embodiments of the systems and methods according to this invention, the output of the gesture recognition system 200 can be used to provide compensation to the automatic speech recognition system 100. Additionally, their combined output can be further processed to extract meaning from the combination of the two different input modes. In general, when there are two or more different input modes, any of one or more of the input modes can be used to provide compensation to one or more other ones of the input modes.

Thus, it should further be appreciated that, while the following detailed description focuses on speech and gesture as the two input modes, any two or more input modes that can provide compensation between the modes, which can be combined to allow meaning to be extracted from the two or more recognized outputs, or both, can be used in place of, or in addition to, the speech and gesture input modes discussed herein.

In particular, as shown in FIG. 2, when speech and gesture are the implemented input modes, a multimodal user input device 400 includes a gesture input portion 410 and a speech input portion 420. The gesture input portion 410 outputs a gesture signal 205 to a gesture recognition system 200 of the multimodal recognition and/or meaning system 1000. At the same time, the speech input portion 420 outputs the speech signal 105 to the automatic speech recognition system 100. The gesture recognition system 200 generates a gesture recognition lattice 255 based on the input gesture signal 205 and outputs the gesture recognition lattice 255 to a multimodal parser and meaning recognition system 300 of the multimodal recognition and/or meaning system 1000.

In those various exemplary embodiments that provide compensation between the gesture and speech recognition systems 200 and 100, the multimodal parser/meaning recognition system 300 generates a new grammar or language model lattice 160 for the utterance recognition subsystem 170 of the automatic speech recognition system 100 from the gesture recognition lattice 255. In particular, this new grammar or language model lattice 160 generated by the multimodal parser/meaning recognition system 300 is specific to the particular sets of gestural inputs generated by a user through the gesture input portion 410 of the multimodal user input device 400. Thus, this new grammar or language model lattice 160 represents all of the possible spoken strings that can successfully combine with the particular sequence of gestures input by the user through the gesture input portion 410. That is, the recognition performed by the automatic speech recognition system 100 can be improved because the particular grammar or language model lattice 160 being used to recognize that spoken utterance is highly specific to the particular sequence of gestures made by the user.

The automatic speech recognition system 100 then outputs the recognized possible word sequence lattice 175 back to the multimodal parser/meaning recognition system 300. In those various exemplary embodiments that do not extract meaning from the combination of the recognized gesture and the recognized speech, the recognized possible word sequences lattice 175 is then output to a downstream processing task. The multimodal recognition and/or meaning system 1000 then waits for the next set of inputs from the multimodal user input device 400.

In contrast, in those exemplary embodiments that additionally extract meaning from the combination of the recognized gesture and the recognized speech, the multimodal parser/meaning recognition system 300 extracts meaning from the combination of the gesture recognition lattice 255 and the recognized possible word sequences lattice 175. Because the spoken utterances input by the user through the speech input portion 420 are presumably closely related to the gestures input at the same time by the user through the gesture input portion 410, the meaning of those gestures can be tightly integrated with the meaning of the spoken input generated by the user through the speech input portion 420.

The multimodal parser/meaning recognition system 300 outputs a recognized possible meaning lattice 375 in addition to, or in place of, one or both of the gesture recognition lattice 255 and/or the recognized possible word sequences lattice 175. In various exemplary embodiments, the multimodal parser and meaning recognition system 300 combines the recognized lattice of possible word sequences 175 generated by the automatic speech recognition system 100 with the gesture recognition lattice 255 output by the gesture recognition system 200 to generate the lattice of possible meaning sequences 375 corresponding to the multimodal gesture and speech inputs received from the user through the multimodal user input device 400.

Moreover, in contrast to both of the embodiments outlined above, in those exemplary embodiments that only extract meaning from the combination of the recognized multimodal inputs, the multimodal parser/meaning recognition system 300 does not generate the new grammar or language model lattice 160. Thus, the gesture recognition lattice 255 does not provide compensation to the automatic speech recognition system 100. Rather, the multimodal parser/meaning recognition system 300 only combines the gesture recognition lattice 255 and the recognized possible word sequences lattice 175 to generate the recognition meaning lattice 375.

When the gesture recognition system 200 generates only a single recognized possible sequence of gestures as the gesture recognition lattice 255, that means there is essentially no uncertainty in the gesture recognition. In this case, the gesture recognition lattice 255 provides compensation to the automatic speech recognition system 100 for any uncertainty in the speech recognition process. However, the gesture recognition system 200 can generate a lattice of n possible recognized gesture sequences as the gesture recognition lattice 255. This recognizes that there may also be uncertainty in the gesture recognition process.

In this case, the gesture recognition lattice 255 and the word lattice 155 provide mutual compensation for the uncertainties in both the speech recognition process and the gesture recognition process. That is, in the face of this uncertainty, the best, i.e., most-probable, combination of one of the n-best word sequences in the word lattice 155 with one of the n-best gesture sequences in the gesture recognition lattice may not include the best recognition possible sequence from either the word lattice 155 or the gesture recognition lattice 255. For example, the most-probable sequence of gestures in the gesture recognition lattice may combine only with a rather low-probability word sequence through the word lattice, while the most-probable word sequence may combine well only with a rather low-probability gesture sequence. In contrast, a medium-probability word sequence may match very well with a medium-probability gesture sequence. Thus, the net probability of this latter combination of word and gesture sequences may be higher than the probability of the combination of the best word sequence with any of the gesture sequences through the gesture recognition lattice 255 and may be higher than the probability of the combination of the best gesture sequence with any of the word sequences through the lattice of possible word sequences 155. In this way, mutual compensation is provided between the gesture recognition system 200 and the automatic speech recognition system 100.

Figure 3:
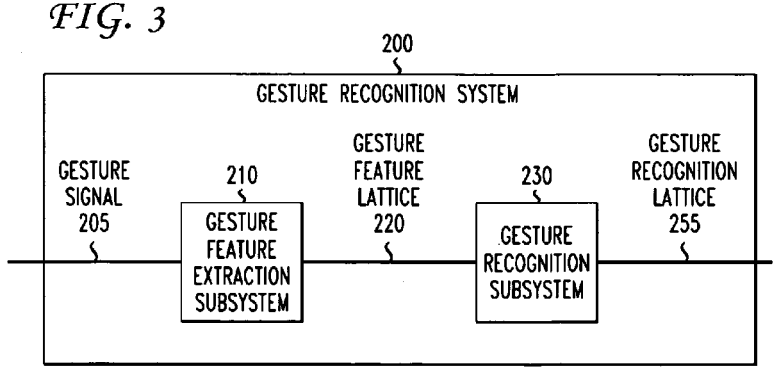
FIG. 3 is a block diagram illustrating in greater detail one exemplary embodiment of the gesture recognition system of FIG. 2.
Figure 4:
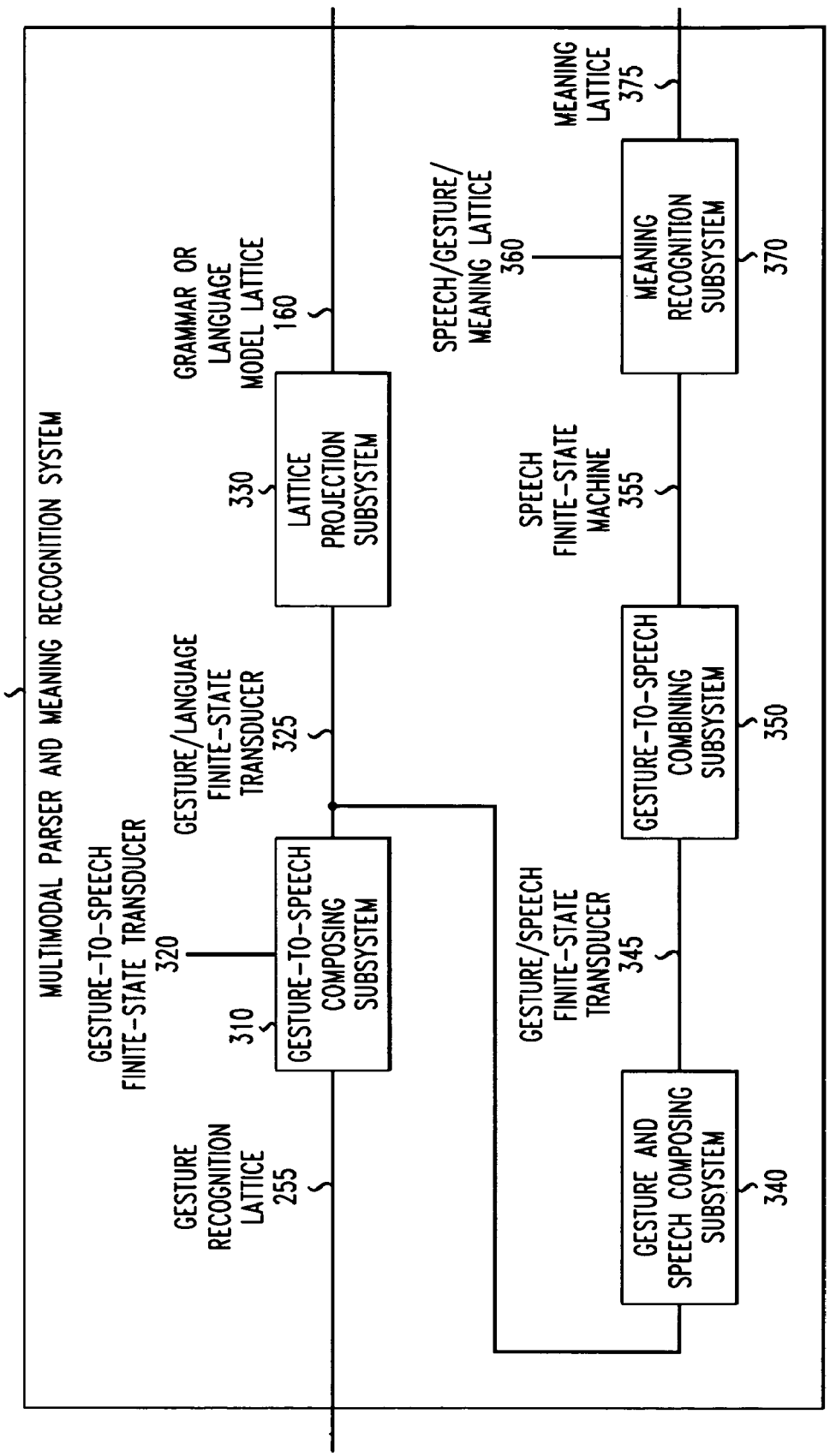
FIG. 4 is a block diagram illustrating in greater detail one exemplary embodiment of the multimodal parser and meaning recognition system of FIG. 2.

FIGS. 3-5 illustrate in greater detail various exemplary embodiments of the gesture recognition system 200, the multimodal parser/meaning recognition system 300, and the multimodal user input device 400. In particular, as shown in FIG. 3, one exemplary embodiment of the gesture recognition system 200 includes a gesture feature extraction subsystem 210 and a gesture recognition subsystem 230. Various other exemplary embodiments may include a gesture language model lattice and a gesture meaning subsystem. In operation, gesture utterances are input through the gesture input portion 410 of the multimodal user input device 400, which converts the movements of an input device, such as a mouse, a pen, a trackball, a track pad or any other known or later-developed gestural input device, into an electronic gesture signal 205. At the same time, the multimodal user input device 400 converts the gestural input into digital ink that can be viewed and understood by the user. This is shown in greater detail in FIG. 5.

The gesture feature extraction subsystem 210 converts the motions of the gesture input device represented by the gesture signal 205 into a gesture feature lattice 220. As disclosed in Johnston 1-3, the various gestures that can be made can be as simple as pointing gestures to a particular information element at a particular location within the gesture input portion 410 of the multimodal user input device 400, or can be as complex as a specialized symbol that represents a type of military unit on a military map displayed in the gesture input portion 410 of the multimodal user input portion 400 and includes an indication of how the unit is to move, and which unit is to move and how far that unit is to move, as described in detail in Johnston 1.

The gesture feature lattice 220 is input to the gesture recognition subsystem 230. The gesture recognition subsystem 230 may be implemented as a neural network, as a Hidden-Markov Model (HMM) or as a simpler template-based gesture classification algorithm. The gesture recognition subsystem 230 converts the gesture feature lattice 220 into the gesture recognition lattice 255. The gesture recognition lattice 255 includes the identities of graphical elements against which diectic and other simple "identification" gestures are made, possible recognition of more complex gestures that the user may have made and possibly the locations on the displayed graphics where the more complex gesture was made, such as in Johnston 1, and the like. As shown in FIG. 2, the gesture recognition system 200 outputs the gesture recognition lattice 255 to the multimodal parser/meaning recognition system 300.

It should be appreciated that the gesture feature recognition subsystem 210 and the gesture recognition subsystem 230 can each be implemented using any known or later-developed system, circuit or technique that is appropriate. In general, the entire gesture recognition system 200 can be implemented using any known or later-developed system that generates a directed graph from a gesture input.

For example, one known system captures the time and location or locations of the gesture. Optionally, these inputs are then normalized and/or rotated. The gestures are then provided to a pattern classification device that is implemented as part of the gesture feature recognition subsystem 210. In various exemplary embodiments, this pattern classification device is a template matching system, which transforms the gesture into a feature vector. In various other exemplary embodiments, this pattern classification device is a neural network or a Hidden Markov Model that has been trained to recognize certain patterns of one or more temporally and/or spatially related gesture components as a specific set of features.

When a single gesture is formed by two or more temporally and/or spatially related gesture components, those gesture components can be combined into a single gesture either during the recognition process or by the multimodal parser/meaning recognition system 300. Once the gesture features are extracted, the'gesture recognition subsystem 230 combines the temporally adjacent gestures into a lattice of one or more recognized possible gesture sequences that represent how the recognized gestures follow each other in time.

Figure 7:
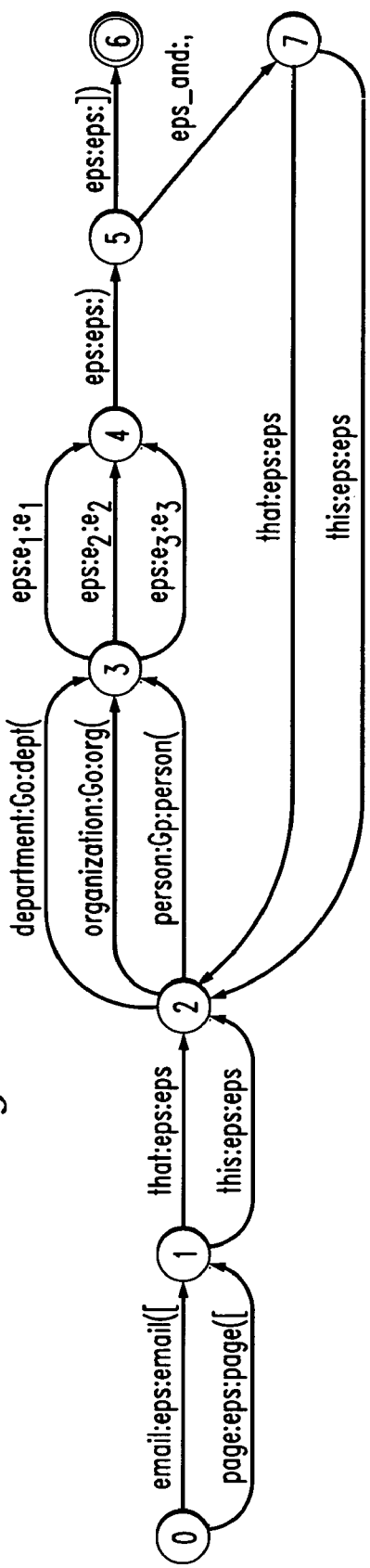
FIG. 7 is one exemplary embodiment of a three-tape multimodal finite-state automaton usable to recognize the multimodal inputs received from the exemplary embodiment of the multimodal user input device shown in FIG. 5.

In various exemplary embodiments, the multimodal parser and meaning recognition system 300 can be implemented using a single three-tape finite-state device that inputs the output lattices from the speech recognition system 100 and the gesture recognition system 200 and directly obtains and outputs a meaning result. In various exemplary embodiments, the three-tape finite-state device is a three-tape grammar model that relates the gestures and the words to a meaning of the combination of a gesture and a word. FIG. 7 shows a portion of such a three-tape grammar model usable in the multimodal parser and meaning recognition system 300 to generate a meaning output from gesture and speech recognition inputs. In general, the multimodal parser and meaning recognition system 300 can be implemented using an n-tape finite-state device that inputs n–1 lattices from a plurality of recognition systems usable to recognize an utterance having a plurality of different modes.

FIG. 4 shows the multimodal parser/meaning recognition system 300 in greater detail. As shown in FIG. 4, the multimodal parser/meaning recognition system 300 may include one or more of a gesture-to-speech composing subsystem 310, a gesture-to-speech finite-state transducer 320, a lattice projection subsystem 330, a gesture and speech composing subsystem 340, a speech/gesture combining subsystem 350, a speech/gesture/meaning lattice 360 and/or a meaning recognition subsystem 370. In particular, the gesture-to-speech composing subsystem 310 inputs the gesture recognition lattice 255 output by the gesture recognition system 200 and composes it with the gesture-to-speech finite-state transducer 320 to generate a gesture/language finite-state transducer 325. The gesture/language finite-state transducer 325 is output to both the lattice projection subsystem 330 and the gesture and speech composing subsystem 340.

The lattice projection subsystem 330 generates a projection of the gesture/language finite-state transducer 325 and outputs the projection of the gesture/language finite-state transducer 325 as the grammar or language model lattice 160 to the automatic speech recognition system 100. Thus, if the multimodal parser/meaning recognition system 300 does not also extract meaning, the gesture and speech composing subsystem 340, the speech/gesture combining subsystem 350, the speech/gesture/meaning lattice 360 and the meaning recognition subsystem 370 can be omitted. Similarly, if the multimodal parser/meaning recognition system 300 does not generate a new grammar or language model lattice 160 for the automatic speech recognition system 100, at least the lattice projection subsystem 330 can be omitted.

In those various embodiments that combine the gesture recognition lattice 255 and the recognized possible lattice of word sequences 175, whether or not the automatic speech recognition 100 has generated the lattice of possible word sequences 175 based on using the projection of the gesture/language finite-state transducer 325 as the grammar or language model or lattice 160, the lattice of possible word sequences 175 is input by the multimodal parser/meaning recognition system 300. In particular, the gesture and speech composing subsystem 340 inputs both the lattice of possible word sequences 175 and the gesture/language finite-state transducer 325. In those various exemplary embodiments that do not use the output of the gesture recognition system 200 to provide compensation between the speech and gesture recognition systems 100 and 200, the gesture/language finite-state transducer 325 can be generated using any known or later-developed technique for relating the gesture recognition lattice 255 to the recognized possible lattice of word sequences 175 in place of the gesture-to-speech composing subsystem 310 and the gesture-to-speech finite-state transducer 320.

In those various exemplary embodiments that extract meaning from the multimodal inputs, the gesture and speech composing subsystem 340 composes these lattices to generate a gesture/speech finite-state transducer 345. The gesture and speech composing subsystem 340 outputs the gesture/speech finite-state transducer 345 to the speech/gesture combining subsystem 350. The speech/gesture combining subsystem 350 converts the gesture/speech finite-state transducer 345 to a gesture/speech finite-state machine 355. The gesture/speech finite-state machine 355 is output by the speech/gesture combining subsystem 350 to the meaning recognition subsystem 370. The meaning recognition subsystem 370 composes the gesture/speech finite-state machine 355 with the speech/gesture/meaning finite-state transducer 360 to generate a meaning lattice 375. The meaning lattice 375 combines the recognition of the speech utterance input through the speech input portion 420 and the recognition of the gestures input through the gesture input portion 410 of the multimodal user input device 400. The most probable meaning is then selected from the meaning lattice 375 and output to a downstream task.

It should be appreciated that the systems and methods disclosed herein use certain simplifying assumptions with respect to temporal constraints. In multi-gesture utterances, the primary function of temporal constraints is to force an order on the gestures. For example, if a user generates the spoken utterance "move this here" and simultaneously makes two gestures, then the first gesture corresponds to the spoken utterance "this", while the second gesture corresponds to the spoken utterance "here". In the various exemplary embodiments of the systems and methods according to this invention described herein, the multimodal grammars encode order, but do not impose explicit temporal constraints. However, it should be appreciated that there are multimodal applications in which more specific temporal constraints are relevant. For example, specific temporal constraints can be relevant in selecting among unimodal and multimodal interpretations. That is, if a gesture is temporally distant from the speech, then the unimodal interpretation should be preferred.

To illustrate the operation of the multimodal recognition and/or meaning system 1000, assume the multimodal user input device 400 includes the gesture input portions 410 and speed input portion 420 as shown in FIG. 5. In particular, the gesture input portion 410 displays a graphical user interface that allows the user to direct either e-mail messages or pager messages to the various persons, departments, and/or organizations represented by the objects 412 displayed in the gesture input portion 410. The multimodal user input device 400 also allows the user to input spoken commands to the speech input portion, or microphone, 420. For simple illustration, further assume that the user has generated the two gestures 414 shown in FIG. 5 and has spoken the utterance "e-mail this person and that organization" in association with generating the gestures 414 against the graphical user interface object 412 labeled "Robert DeNiro" and the graphical user interface object 412 labeled "Monumental Pictures", respectively.

The structure interpretation of multimodal commands of this kind can be captured declaratively in a multimodal context-free grammar. A multimodal context-free grammar can be defined formally as the quadruple MCFG as follows:

MCFG=<N, T, P, S> where
N is the set of non-terminals;
P is the set of projections of the form:
A→α a where A∈N and α∈(N∪T)*;
S is the start symbol for the grammar;
T is the set of terminals:
((W∪ε)×(G∪ε)×(M∪ε)$^+$),
where W is the vocabulary of the speech;
G is the vocabulary of gesture:
G=(GestureSymbols∪EventSymbols);
GestureSymbols={Gp, Go, Gpf, Gpm ...};
Finite collections of EventSymbols={$e_1$, $e_2$ ...}; and
M is the vocabulary that represents meaning and includes EventSymbols ⊂ M.

In general, a context-free grammar can be approximated by a finite-state automaton. The transition symbols of the finite-state automaton are the terminals of the context-free grammar. In the case of the multimodal context-free grammar defined above, these terminals contain three components, W, G and M. With respect to the discussion outlined above regarding temporal constraints, more specific temporal constraints than order can be encoded in the finite-state approach by writing symbols representing the passage of time onto the gesture tape and referring to such symbols in the multimodal grammar.

FIG. 6 illustrates a fragment of such a multimodal context-free grammar that is capable of handling the gesture and spoken utterances illustrated in FIG. 5. FIG. 7 illustrates a three-tape finite-state automaton corresponding to the multimodal context-free grammar fragment shown in FIG. 6 that is capable of handling the gesture and spoken utterances illustrated in FIG. 5. The non-terminals in the multimodal context-free grammar shown in FIG. 6 are atomic symbols. The multimodal aspects of the context-free grammar become apparent in the terminals. Each terminal contains three components "W:G:M", corresponding to the n+1 tapes, where:

W represents the spoken language component;
G represents the gesture component; and
M represents the combined meaning of the spoken language and gesture components.

The ε symbol is used to indicate when one of these components is empty in a given terminal. The symbols in the spoken language component W are words from the speech recognition lattice, i.e., the lattice of possible word sequences 175. The symbols in the gesture component G include the gesture symbols discussed above, as well as the identifier variables e.

In the exemplary embodiment of the gesture input portion 410 shown in FIG. 5, the gestures 414 are simple deictic circling gestures. The gesture meaning subsystem 250 assigns semantic types to each gesture 414 based on the underlining portion of the gesture input portion 410 against which the gestures 414 are made. In the exemplary embodiment shown in FIG. 5, the gestures 414 are made relative to the objects 412 that can represent people, organizations or departments to which an e-mail message or a pager message can be directed. If the gesture input portion 410 were instead a map, the gestures would be referenced against particular map coordinates, where the gesture indicates the action to be taken at particular map coordinates or the location of people or things at the indicated map location.

Compared with a feature-based multimodal grammar, these semantic types constitute a set of atomic categories which make the relevant distinctions for gesture events to predict speech events and vice versa. For example, if the gesture is a deictic, i.e., pointing, gesture to an object in the gesture input portion 410 that represents a particular person, then spoken utterances like "this person", "him", "her", and the like, are the preferred or predicted speech events and vice versa. These categories also play a role in constraining the semantic representation when the speech is underspecified with respect to the semantic type, such as, for example, spoken utterances like "this one".

In some exemplary embodiments, the gesture symbols G can be organized into a type hierarchy reflecting the ontology of the entities in the application domain. For example, in the exemplary embodiment of the gesture input portion 410 shown in FIG. 5, a pointing gesture may be assigned the general semantic type "G". This general semantic gesture "G" may have various subtypes, such as "Go" and "Gp", where "Go" represents a gesture made against an organization object, while the "$G_p$" gesture is made against a person object. Furthermore, the "Gp" type gesture may itself have subtypes, such as, for example, "Gpm" and "Gpf" for objects that respectively represent male and female persons.

In the unification-based multimodal grammar disclosed in Johnston 1-3, spoken phrases and gestures are assigned typed feature structures by the natural language and gesture interpretation systems, respectively. In particular, each gesture feature structure includes a content portion that allows the specific location of the gesture on the gesture input portion of the multimodal user input device 400 to be specified.

In contrast, when using finite-state automata, a unique identifier is needed for each object or location in the gesture input portion 410 that a user can gesture on. For example, in the exemplary embodiment shown in FIG. 5, the finite-state automata would need to include a unique identifier for each object 412. In particular, as part of the composition process performed by the gesture recognition system 200, as well as the various composition processes described below, these identifiers would need to be copied from the gesture feature lattice 220 into the semantic representation represented by the gesture recognition lattice 255 generated by the gesture meaning subsystem 250.

In the unification-based approach to multimodal integration disclosed in Johnston 1-3, this is achieved by feature sharing. In the finite-state approach used in the systems and methods according to this invention, one possible, but ultimately unworkable solution, would be to incorporate all of the different possible identifiers for all of the different possible elements of the gesture input device 410; against which a gesture could be made, into the finite-state automata. For example, for an object having an identifier "object identifier 345", an arc in the lattices would need to be labeled with that identifier to transfer that piece of information from the gesture tape to the meaning tape of the finite-state automaton. Moreover, the arc for each different identifier would have to be repeated numerous times in the network wherever this transfer of information would be needed. Furthermore, the various arcs would have to be updated as the underlying objects within the gesture input portion 410 were updated or changed.

In various exemplary embodiments, the systems and methods according to this invention overcome this problem by storing the specific identifiers of the elements within the gesture input portion 410 associated with incoming gestures into a finite set of variables labeled "$e_1$", "$e_2$", "$e_3$", .... Then, in place of the specific object identifier, the labels of the variables storing that specific object identifier are incorporated into the various finite-state automata. Thus, instead of having arcs labeled with specific values in the finite-state automata, the finite-state automata include arcs labeled with the labels of the variables.

Therefore, instead of having the specific values for each possible object identifier in a finite-state automaton, that finite-state automaton instead incorporates the transitions "$\epsilon:e_1:e_1$", "$\epsilon:e_2:e_2$", "$\epsilon:e_3:e_3$", . . . in each location in the finite-state automaton where specific content needs to be transferred from the gesture tape to the meaning tape. These transitions labeled with the variable labels are generated from the "ENTRY" productions in the multimodal context-free grammar shown in FIG. 6.

In operation, the gesture recognition system 200 empties the variables $e_1, e_2, e_3$ . . . after each multimodal command, so that all of the variables can be reused after each multimodal command. This allows the finite-state automaton to be built using a finite set of variables. However, this limits the number of distinct gesture events in a single utterance to no more than the available number of variables.

Figure 8:
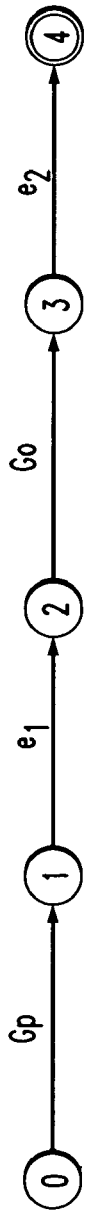
FIG. 8 is one exemplary embodiment of a gesture finite-state machine generated by recognizing the gesture inputs shown in the exemplary embodiment of the multimodal user input device shown in FIG. 5.

Accordingly, assuming a user using the gesture input portion 410 shown in FIG. 5 made the gestures 414 shown in FIG. 5, the gesture recognition system 200 would output, as the gesture recognition lattice 255, the finite-state machine shown in FIG. 8. In this case, as shown in FIG. 8, the arc labeled "Gp" corresponds to the gesture made against a person object while the arc labeled "Go" represents a gesture made against an organization object. The arc labeled "$e_1$" stores the identifier of the person object 412, in this case, the person object 412 labeled "Robert DeNiro", against which the person-object gesture "Gp" 414 was made. Similarly, the arc labeled "$e_2$" represents the variable storing the identifier of the organization object 412, in this case "Monumental Pictures", against which the organization gesture 414 was made.

In the finite-state automata approach used in the systems and methods according to this invention, in addition to capturing the structure of language with the finite-state device, meaning is also captured. This is significant in multimodal language processing, because the central goal is to capture how the multiple modes contribute to the combined interpretation. In the finite-state automata technique used in the systems and methods according to this invention, symbols are written onto the third tape of the three-tape finite-state automaton, which, when concatenated together, yield the semantic representation for the multimodal utterance.

In the following discussion, based on the exemplary utterance outlined above with respect to FIG. 5, a simple logical representation can be used. This simple representation includes predicates "pred ( . . . )" and lists "[a, b, . . . ]". However, it should be appreciated that many other kinds of semantic representations could be generated, such as code in a programming or scripting language that could be executed directly.

In the simple logical representation outlined above, referring to the exemplary multimodal utterance outlined above with respect to FIG. 5, the recognized word "e-mail" causes the predicate "e-mail ([" to be added to the semantics tape. Similarly, the recognized word "person" causes the predicate "person (" to be written on the semantics tape. The e-mail predicate and the list internal to the e-mail predicate are closed when the rule "S→V MP $\epsilon:\epsilon:]$)", as shown in FIG. 6, applies.

Returning to the exemplary utterance "e-mail this person and that organization" and the associated gestures outlined above with respect to FIG. 5, assume that the objects against which the gestures 414 have been made have the identifiers "objid367" and "objid893". Then, the elements on the meaning tape of the three-tape finite-state automaton are concatenated and the variable references are replaced to yield the meaning "e-mail([person(objid367), organization (objid893)])".

As more recursive semantic phenomena, such as possessives and other complex noun phrases, are added to the grammar, the resulting finite-state automata become ever larger. The computational consequences of this can be lessened by the lazy evaluation techniques in Mohri.

While a three-tape finite-state automaton is feasible in principle, currently available tools for finite-state language processing generally only support two-tape finite-state automata, i.e., finite-state transducers. Furthermore, speech recognizers typically do not support the use of a three-tape finite-state automaton as a language model. Accordingly, the multimodal recognition and/or meaning system 1000 implements this three-tape finite-state automaton approach by using a series of finite-state transducers in place of the single three-tape finite-state automaton shown in FIG. 7, as described below. In particular, the three-tape finite-state automaton shown in FIG. 7 and illustrated by the grammar fragment shown in FIG. 6 can be decomposed into an input component relating the gesture symbols G and the word symbols W and an output component that relates the input component to the meaning symbols M.

As indicated above, FIG. 7 shows a three-tape finite-state automaton that corresponds to the grammar fragment shown in FIG. 6 and that is usable to recognize the meaning of the various spoken and gestural inputs that can be generated using the graphical user interface displayed in the gesture input portion 410 of the multimodal user input device 400 shown in FIG. 5. The three-tape finite-state automaton shown in FIG. 7 is decomposed into the gesture-to-speech finite-state transducer shown in FIG. 9 and the speech/gesture/meaning finite-state transducer shown in FIG. 10.

Figure 9:
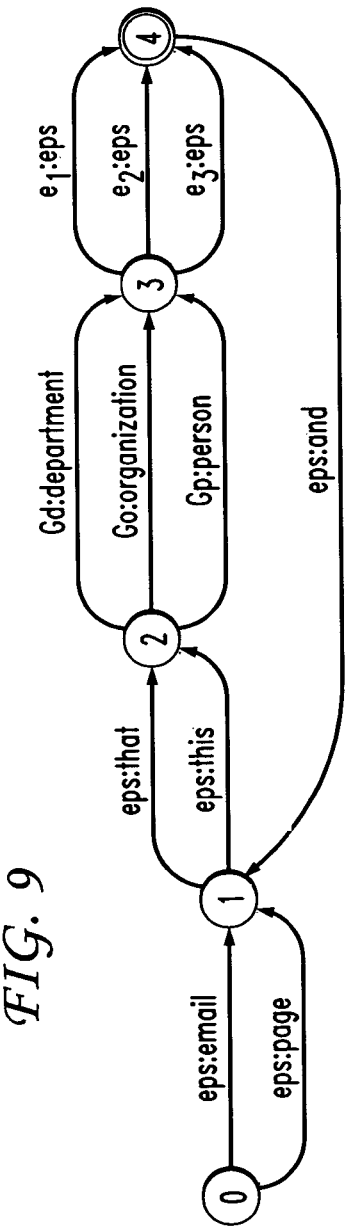
FIG. 9 is one exemplary embodiment of a gesture-to-speech finite-state transducer that represents the relationship between speech and gesture for the exemplary embodiment of the multimodal user input device shown in FIG. 5.

The gesture-to-speech finite-state transducer shown in FIG. 9 maps the gesture symbols G to the word symbols W that are expected to coincide with each other. Thus, in the exemplary embodiment of the multimodal user input device 400 shown in FIG. 4, the verbal pointers "that" and "this" are expected to be accompanied by the deictic gestures 414 made against either a department object, an organization object or a person object 412, where the object identifier for the object 412 against which the deictic gesture 414 was made is stored in one of the variables $e_1$, $e_2$, or $e_3$. The gesture-to-speech transducer shown in FIG. 9 captures the constraints that the gestures made by the user through the gesture input portion 410 of the multimodal user input device 400 place on the speech utterance that accompanies those gestures. Accordingly, a projection of the output tape of the gesture-to-speech finite-state transducer shown in FIG. 9 can be used, in conjunction with the recognized gesture string, such as the recognized gesture string shown in FIG. 8 that represents the gestures illustrated in the exemplary embodiment of the multimodal user input device 400 shown in FIG. 5, as a language model usable to constrain the possible sequences of words to be recognized by the utterance recognition subsystem 170 of the automatic speech recognition system 100.

It should be appreciated that, in those exemplary embodiments that do not also extract meaning, the further processing outlined below with respect to FIGS. 10-17 can be omitted. Similarly, in those exemplary embodiments that do not use one or more of the multimodal inputs to provide compensation to one or more of the other multimodal inputs, the processing outlined above with respect to FIGS. 7-9 can be omitted.

Figure 10:
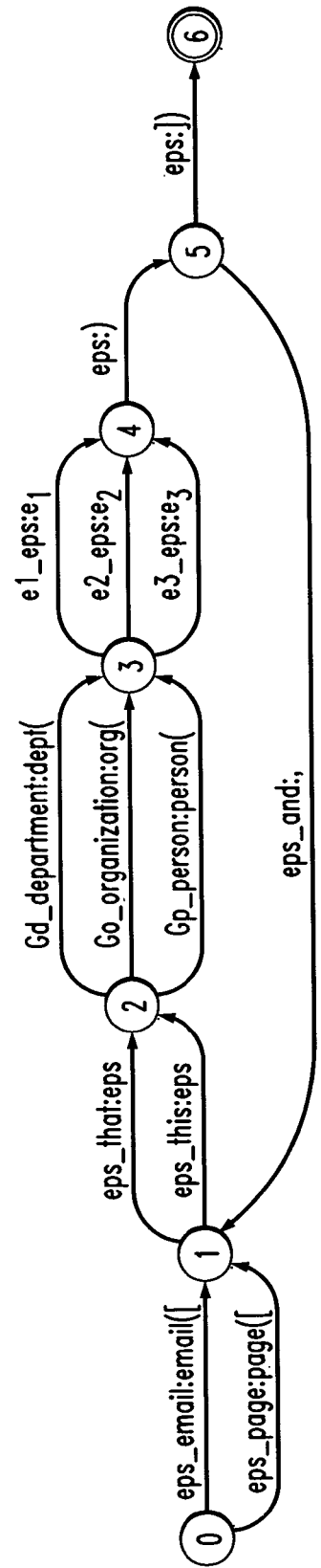
FIG. 10 is one exemplary embodiment of a speech/gesture/meaning finite-state transducer that represents the relationship between the combined speech and gesture symbols and the semantic meaning of the multimodal input for the exemplary embodiment of the multimodal input device shown in FIG. 5.

The speech/gesture/meaning finite-state transducer shown in FIG. 10 uses the cross-product of the gesture symbols G and the word symbols W as an input component or first tape. Thus, the gesture-to-speech finite-state transducer shown in FIG. 9 implements the function $\Re$: G→W. The output or second tape of the speech/gesture/meaning finite-state transducer shown in FIG. 10 contains the meaning symbols M that capture the semantic representation of the multimodal utterance, as shown in FIG. 7 and outlined above. Thus, the speech/gesture/meaning finite-state transducer shown in FIG. 10 implements the function $\Im$: (G×W)→M. That is, the speech/gesture/meaning finite-state transducer shown in FIG. 10 is a finite-state transducer in which gesture symbols and words are on the input tape and the meaning is on the output tape.

Thus, the gesture-to-speech finite-state transducer and the speech/gesture/meaning finite-state transducers shown in FIGS. 9 and 10 are used with the speech recognition system 100 and the multimodal parser/meaning recognition system 300 to recognize, parse, and/or extract the meaning from the multimodal inputs received from the gesture and speech input portions 410 and 420 of the multimodal user input device 400.

It should be appreciated that there are any variety of ways in which the multimodal finite-state transducers can be integrated with the automatic speech recognition system 100, the gesture recognition system 200 and the multimodal parser/meaning recognition system 300. Clearly, for any particular recognition task, the more appropriate approach will depend on the properties of the particular multimodal user input interface 400 through which the multimodal inputs are generated and/or received.

The approach outlined in the following description of FIGS. 8-17 involves recognizing the gesture string first. The recognized gesture string is then used to modify the language model used by the automatic speech recognition system 100. In general, this will be appropriate when there is limited ambiguity in the recognized gesture string. For example, there will be limited ambiguity in the recognized gesture string when the majority of gestures are unambiguous deictic pointing gestures. Obviously, if more complex gestures are used, such as the multi-element gestures described in Johnston 1-3, other ways of combining the gesture and speech recognition systems may be more appropriate.

Accordingly, for the specific exemplary embodiment of the multimodal user input device 400 shown in FIG. 5, the gesture recognition system 200 first processes the incoming gestures to construct a gesture finite-state machine, such as that shown in FIG. 8, corresponding to the range of gesture interpretations. In the exemplary embodiments described above with respect to FIGS. 5, 6 and 7, the gesture input is unambiguous. Thus, as shown in FIG. 8, a simple linearly-connected set of states forms the gesture finite-state machine shown in FIG. 8. It should be appreciated that, if the received gestures involved more complex gesture recognition or were otherwise ambiguous, the recognized string of gestures would be represented as a lattice indicating all of the possible gesture recognitions and interpretations for the received gesture stream. Moreover, a weighted finite-state transducer could be used to incorporate the likelihoods of the various paths in such a lattice.

Figure 11:
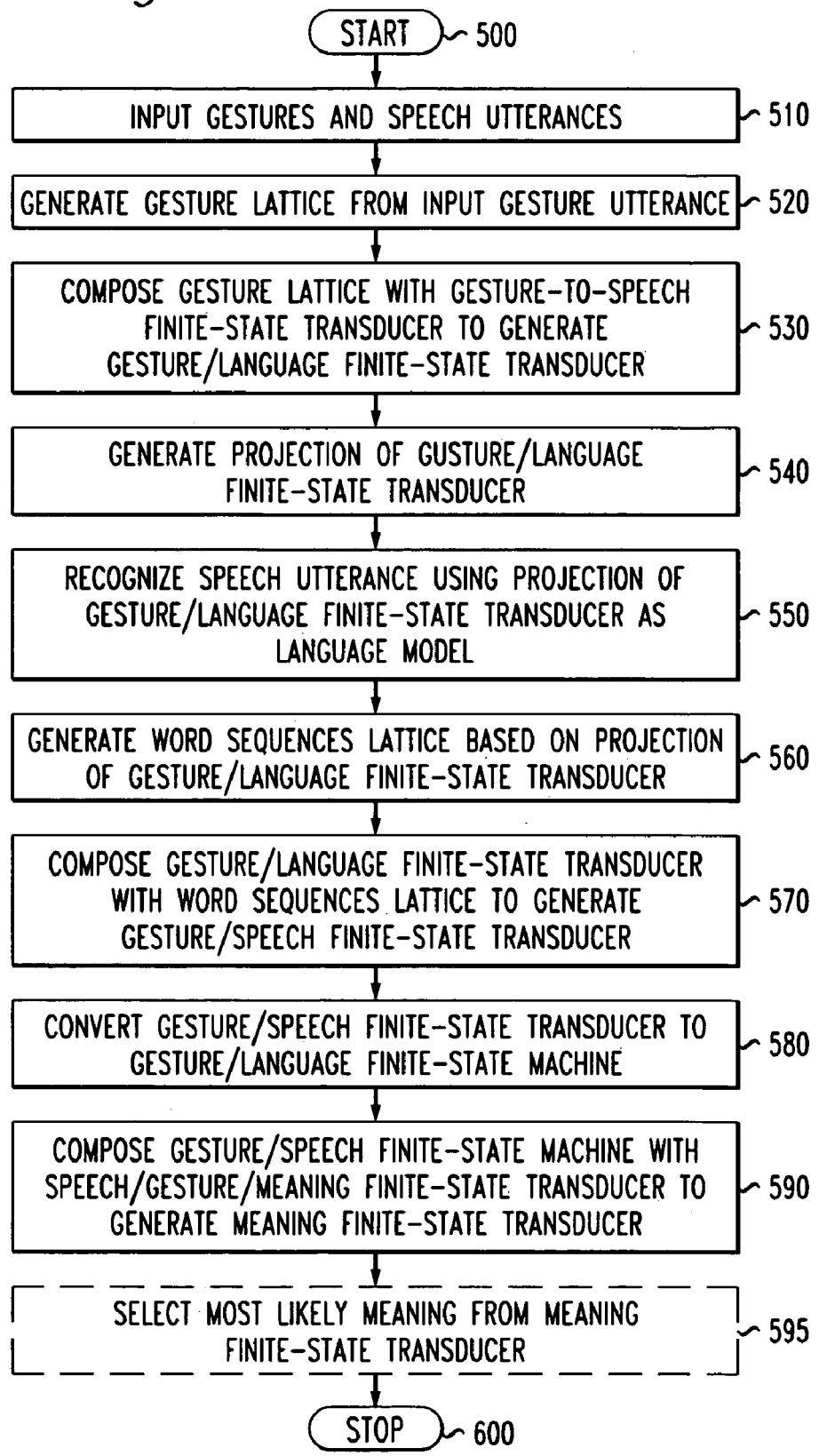
FIG. 11 is a flowchart outlining one exemplary embodiment of a method for extracting meaning from a plurality of multimodal inputs.

FIG. 11 is a flowchart outlining one exemplary embodiment of a method for combining and converting the various multimodal input streams into a combined finite-state transducer representing the semantic meaning of the combined multimodal input streams. Beginning in step 500, control continues to step 510, where gesture and speech utterances are input through one or more input devices that together combine to form a multimodal user input device. Then, in step 520, a gesture lattice or finite-state machine is generated from the input gesture utterance.

Next, in step 530, the gesture lattice is composed with the gesture-to-speech transducer to generate a gesture/language finite-state transducer. For example, in the exemplary embodiment described above, the gesture finite-state machine shown in FIG. 8 is composed with the gesture-to-speech finite-state transducer shown in FIG. 9 to form the gesture/language finite-state transducer shown in FIG. 12. The gesture/language finite-state transducer represents the relationship between the recognized stream of gestures and all of the possible word sequences that could occur with those gestures of the recognized stream of gestures.

Figure 12:
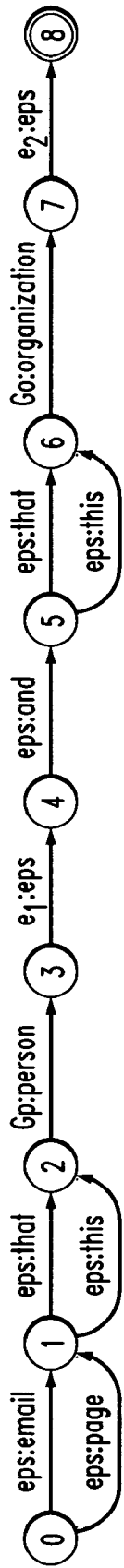
FIG. 12 is one exemplary embodiment of a gesture/language finite-state transducer illustrating the composition of the gesture finite-state machine shown in FIG. 8 with the gesture-to-speech finite-state transducer shown in FIG. 9.
Figure 13:
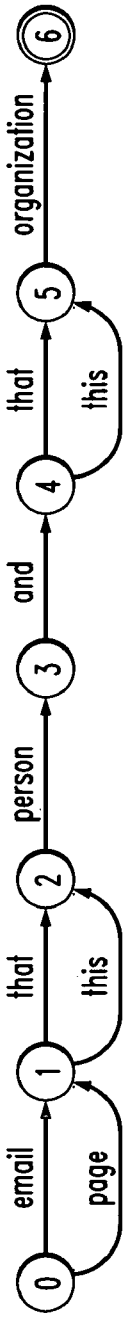
FIG. 13 is one exemplary embodiment of a finite-state machine generated by taking a projection on the output tape of the gesture/language finite-state transducer shown in FIG. 12.

Then, in step 540, in order to use this information to guide the speech recognition system 100, a projection of the gesture/language finite-state transducer is generated. In particular, a projection on the output tape or speech portion of the gesture/language finite-state transducer shown in FIG. 12 is taken to yield a finite-state machine. In particular, in the exemplary embodiment outlined above, a projection of the gesture/language finite-state transducer shown in FIG. 12 is illustrated in FIG. 13.

Figure 14:
FIG. 14 is one exemplary embodiment of a lattice of possible word sequences generated by the automatic speech recognition system shown in FIG. 1 when using the finite-state machine shown in FIG. 13 as a language model in view of the speech input received from the exemplary embodiment of the multimodal user input device shown in FIG. 5.
Figure 15:
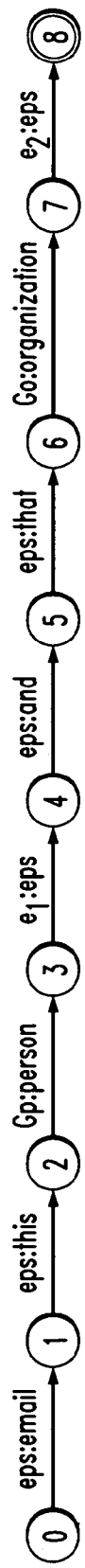
FIG. 15 illustrates one exemplary embodiment of a gesture/speech finite-state transducer generated by composing the gesture/language finite-state transducer shown in FIG. 12 with the word sequence lattice shown in FIG. 14.
Figure 16:
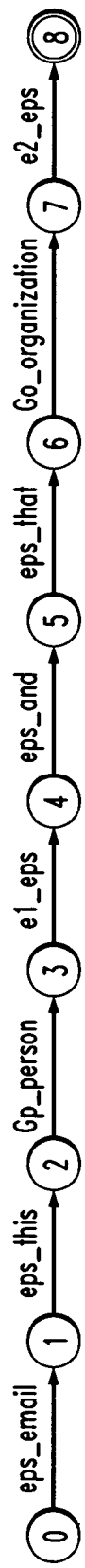
FIG. 16 is one exemplary embodiment of a gesture/speech finite-state machine obtained from the gesture/speech finite-state transducer shown in FIG. 14.

Next, in step 550, the speech utterance is recognized using the projection of the gesture/language finite-state transducer as the language model. Using the projection of the gesture/language finite-state transducer as the language model enables the gestural information to directly influence the recognition process performed by the automatic speech recognition system 100. In particular, as shown in step 560, the automatic speech recognition system generates a word sequence lattice based on the projection of the gesture/language finite-state transducer in view of the word lattice 155. In the exemplary embodiment outlined above, using the projection of the gesture/language finite-state transducer shown in FIG. 13 as the language model for the speech recognition process results in the recognized word sequence lattice "e-mail this person and that organization", as shown in FIG. 14.

Then, in step 570, the gesture/language finite-state transducer is composed with the recognized word sequences lattice to generate a gesture/speech finite-state transducer. This reintegrates the gesture information that was removed when the projection of the gesture/language finite-state transducer was generated in step 540. The generated gesture/speech finite-state transducer contains the information both from the speech utterance and the gesture utterance received from the various portions of the multimodal user input device 400. For the example outlined above, composing the gesture/language finite-state transducer shown in FIG. 12 with the word sequences lattice shown in FIG. 14 generates the gesture/speech finite-state transducer shown in FIG. 15.

Then, in step 580, the gesture/speech finite-state transducer is converted to a gesture/speech finite-state machine. In particular, the gesture/speech finite-state machine combines the input and output tapes of the gesture/speech finite-state transducer onto a single tape. In the exemplary embodiment outlined above, converting the gesture/speech finite-state transducer shown in FIG. 15 results in the gesture/speech finite-state machine shown in FIG. 16.

Figure 17:
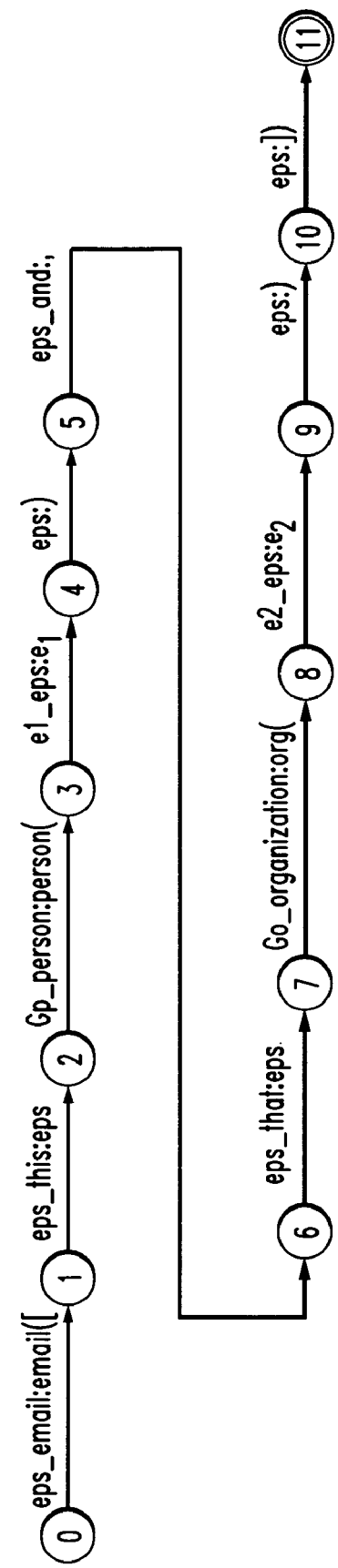
FIG. 17 is one exemplary embodiment of a finite-state transducer, obtained from composing the gesture/speech finite-state machine shown in FIG. 16 with the speech/gesture/meaning finite-state transducer shown in FIG. 10, which extracts the meaning from the multimodal gestural and spoken inputs received when using the exemplary embodiment of the multimodal user input device shown in FIG. 5.

Next, in step 590, the gesture/speech finite-state machine is composed with the speech/gesture/meaning finite-state transducer shown in FIG. 10 to generate the meaning finite-state transducer shown in FIG. 17. Because the speech/gesture/meaning finite-state transducer relates the speech and gesture symbols to meaning, composing the gesture/speech finite-state machine results in the meaning finite-state transducer which captures the combined semantic meaning or representation contained in the independent modes input using the multimodal user input device. Thus, the meaning of the multimodal input received from the multimodal user input device can be read from the output tape of the meaning finite-state transducer. In the exemplary embodiment outlined above, composing the gesture/speech finite-state machine shown in FIG. 16 with the speech/gesture/meaning finite-state transducer shown in FIG. 10 results in the meaning finite-state transducer shown in FIG. 17. In particular, it should be appreciated that the meaning finite-state transducer shown in FIG. 17 is a linear finite-state transducer that unambiguously yields the meaning "e-mail ([person ($e_1$), org ($e_2$)])".

It should be appreciated that, in embodiments that use much more complex multimodal interfaces, such as those illustrated in Johnston 1-3, the meaning finite-state transducer may very well be a weighted finite-state transducer having multiple paths between the start and end nodes representing the various possible meanings for the multimodal input and the probability corresponding to each path. In this case, in step 595, the most likely meaning would be selected from the meaning finite-state transducer based on the path through the meaning finite-state transducer having the highest probability. However, it should be appreciated that step 595 is optional and can be omitted. Then, in step 600, the process ends.

As outlined above, the various exemplary embodiments described herein allow spoken language and gesture input streams to be parsed and integrated by a single weighted finite-state device. This single weighted finite-state device provides language models for speech and gesture recognition and composes the meaning content from the speech and gesture input streams into a single semantic representation. Thus, the various systems and methods according to this invention not only address multimodal language recognition, but also encode the semantics as well as the syntax into a single weighted finite-state device. Compared to the previous approaches for integrating multimodal input streams, such as those described in Johnston 1-3, which compose elements from n-best lists of recognition results, the systems and methods according to this invention provide the potential for mutual compensation among the various multimodal input modes.

The systems and methods according to this invention allow the gestural input to dynamically alter the language model used for speech recognition. Additionally, the systems and methods according to this invention reduce the computational complexity of multi-dimensional multimodal parsing. In particular, the weighted finite-state devices used in the systems and methods according to this invention provide a well-understood probabilistic framework for combining the probability distributions associated with the speech and gesture input streams and for selecting among multiple competing multimodal interpretations.

It should be appreciated that the multimodal recognition and/or meaning system 1000 shown in FIG. 2, and/or each of the gesture recognition system 200, the multimodal parser/meaning recognition system 300 and/or the automatic speech recognition system 100 can each be implemented on a programmed general purpose computer. However, any or all of these systems can also be implemented on a special purpose computer, a programmed microprocessor or microcontroller and peripheral integrated circuit elements, an ASIC or other integrated circuit, a digital signal processor, a hardwired electronic or a logic circuit such as a discrete element circuit, a programmable logic device such as a PLD, a PLA, a FPGA or a PAL, or the like. In general, any device capable of implementing a finite-state machine that is in turn capable of implementing the flowchart shown in FIG. 10 and/or the various finite-state machines and transducers shown in FIGS. 7-9 and 11-17 can be used to implement one or more of the various systems shown in FIGS. 1-4.

Thus, it should be understood that each of the various systems and subsystems shown in FIGS. 1-4 can be implemented as portions of a suitably programmed general purpose computer. Alternatively, each of the systems or subsystems shown in FIGS. 1-4 can be implemented as physically distinct hardware circuits within an ASIC, or using a FPGA, a PLD, a PLA, or a PAL, or using discrete logic elements or discrete circuit elements. The particular form each of the systems and/or subsystems shown in FIGS. 1-4 will take is a design choice and will be obvious and predictable to those skilled in the art.

It should also be appreciated that, while the above-outlined description of the various systems and methods according to this invention and the figures focus on speech and gesture as the multimodal inputs, any known or later-developed set of two or more input streams representing different modes of information or communication, such as speech, electronic-ink-based gestures or haptic modes, keyboard input, inputs generated by observing or sensing human body motions, including hand motions, gaze motions, facial expressions, or other human body motions, or any other known or later-developed method for communicating information, can be combined and used as one of the input streams in the multimodal utterance.

Thus, while this invention has been described in conjunction with the exemplary embodiments outlined above, it is evident that many alternatives, modifications and variations will be apparent to those skilled in the art. Accordingly, the exemplary embodiments of these systems and methods according to this invention, as set forth above, are intended to be illustrative, not limiting. Various changes may be made without departing from the spirit and scope of this invention.

What is claimed is:

1. A method of recognizing an utterance comprising:
recognizing a first mode in a plurality of modes at a multimodal meaning recognition system comprising a processor;
outputting a recognition result for the first mode in the plurality of modes;
generating a recognition model based on the recognition result outputted for the first mode in the plurality of modes, the generating a recognition model comprising:
receiving a gesture recognition lattice and a first finite-state transducer;
relating a first portion of the utterance comprising the first mode to a second portion of the utterance comprising a second mode with the first finite-state transducer; and
generating a second finite-state transducer, wherein the second finite-state transducer comprises a gesture and speech recognition model finite-state transducer based on the gesture recognition lattice and the first finite-state transducer; and
recognizing the second mode in the plurality of modes using the recognition model for the first mode in the plurality of modes,
wherein the recognizing a first mode in a plurality of modes comprises recognizing a gesture mode and the recognizing the second mode in the plurality of modes comprises recognizing a speech mode.

2. The method of claim 1, wherein outputting a recognition result comprises outputting a first mode recognition lattice.

3. The method of claim 2, wherein generating a recognition model based on the recognition result outputted for the first mode in the plurality of modes further comprises:
inputting the first mode recognition lattice;
inputting the first finite-state transducer;
relating the first mode to the second mode with the first finite-state transducer;
outputting the second finite-state transducer, the second finite-state transducer a function of the first mode recognition lattice and the first finite-state transducer.

4. The method of claim 1 further comprising:
receiving the second finite-state transducer; and
generating a second mode recognition model as a function of the second finite-state transducer.

5. A method of recognizing an utterance comprising a plurality of modes comprising:
generating a first recognition result associated with a first mode in the plurality of modes with a first mode recognition subsystem comprising a processor;
generating a recognition model based on the first recognition result with a multimodal recognition subsystem, the generating a recognition model comprising:
receiving a gesture recognition lattice and a first finite-state transducer;
relating a first portion of the utterance comprising the first mode to a second portion of the utterance comprising a second mode with the first finite-state transducer; and
generating a second finite-state transducer, wherein the second finite-state transducer comprises a gesture and speech recognition model finite-state transducer based on the gesture recognition lattice and the first finite-state transducer; and
generating a second recognition result associated with the second mode in the plurality of modes as a function of the recognition model with a second mode recognition subsystem,
wherein the first mode of the generating a first recognition result is a gesture mode and the second mode of the generating a second recognition result is a speech mode.

6. The method of claim 5, wherein generating a first recognition result comprises generating a first mode recognition lattice.

7. The method of claim 6, wherein generating a recognition model with the multimodal recognition subsystem comprises generating the first finite-state transducer, the finite-state transducer a function of the first mode recognition lattice and the second finite-state transducer that relates the first mode to the second mode.

8. The method of claim 7, wherein generating the recognition model based on the first recognition result comprises projecting the second finite-state transducer, the projection a function of the second finite-state transducer.

9. The method of claim 5, wherein generating a recognition model based on the first recognition result comprises generating a gesture recognition model.

10. The method of claim 9, wherein generating the gesture recognition model comprises projecting the gesture and speech recognition model finite-state transducer, the gesture and speech recognition model finite-state transducer generated being a function of the gesture recognition lattice and the first finite-state transducer.

11. The method of claim 5 further comprising generating a speech recognition of the speech mode as a function of a speech recognition model.

12. The method of claim 11, further comprising:
generating a feature vector lattice as a function of a speech signal with a speech processing subsystem;
generating a phone lattice as a function of a feature vector lattice and an acoustic model with a phonetic recognition subsystem;
generating a word lattice as a function of the phone lattice and a lexicon lattice with a word recognition subsystem; and
generating the speech recognition result as a function of the word lattice and the speech recognition model with a spoken mode recognition subsystem.

13. The method of claim 5 further comprising:
generating a gesture feature lattice as a function of the gesture mode with a gesture feature recognition subsystem; and
generating the gesture recognition lattice as a function of the gesture feature lattice with a gesture recognition subsystem.

14. A method of extracting meaning from multimodal inputs comprising:
receiving a multimodal input;
recognizing a plurality of modes of the input at a multimodal meaning recognition system comprising a processor;
outputting a recognition result for each mode of the input, wherein a first recognition result is based on a second recognition result, and the first recognition result is based on a speech mode and the second recognition result is based on a gesture mode;
generating a recognition model based on the recognition result, the generating a recognition model comprising:
receiving a gesture recognition lattice and a first finite-state transducer;
relating a first portion of an utterance comprising the first mode to a second portion of the utterance comprising a second mode with the first finite-state transducer; and
generating a second finite-state transducer, wherein the second finite-state transducer comprises a gesture and speech recognition model finite-state transducer based on the gesture recognition lattice and the first finite-state transducer.

* * * * *